(12) United States Patent
Nishikawa

(10) Patent No.: US 11,340,445 B2
(45) Date of Patent: May 24, 2022

(54) PHOSPHOR WHEEL DEVICE

(71) Applicant: Panasonic Intellectual Property Management Co., Ltd., Osaka (JP)

(72) Inventor: Yusaku Nishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/134,864

(22) Filed: Dec. 28, 2020

(65) Prior Publication Data
US 2021/0116698 A1    Apr. 22, 2021

Related U.S. Application Data

(63) Continuation of application No. PCT/JP2019/025480, filed on Jun. 26, 2019.

(30) Foreign Application Priority Data

Jun. 29, 2018 (JP) .............................. JP2018-125210

(51) Int. Cl.
G02B 26/00 (2006.01)
G03B 21/20 (2006.01)

(52) U.S. Cl.
CPC ......... G02B 26/008 (2013.01); G03B 21/204 (2013.01); G03B 21/208 (2013.01)

(58) Field of Classification Search
CPC ..... G02B 27/141; G02B 26/008; F21V 13/06; F21V 13/14; F21V 14/08; F21V 9/20
See application file for complete search history.

(56) References Cited

U.S. PATENT DOCUMENTS

2012/0062857 A1    3/2012  Saitou et al.
2012/0242912 A1    9/2012  Kitano
(Continued)

FOREIGN PATENT DOCUMENTS

JP    2011-128521        6/2011
JP    2012048832 A  *   3/2012
(Continued)

OTHER PUBLICATIONS

English Translation of the International Preliminary Report on Patentability dated Jan. 7, 2021 in International Application No. PCT/JP2019/025480.
(Continued)

*Primary Examiner* — William J Carter
(74) *Attorney, Agent, or Firm* — Wenderoth, Lind & Ponack, L.L.P.

(57) ABSTRACT

The first dichroic filter is in a region including a circumference having a first radius, transmits source light and reflects fluorescence. The phosphor is in a region having a predetermined angular width of a region including a circumference having the first radius, and excited by source light to generate fluorescence. The first transmission window is in a region different from the region of the phosphor and transmits incident light. The second dichroic filter is in a region having a predetermined angular width of a region including a circumference having a second radius, and transmits source light and reflects incident light. The second transmission window is in a region different from the second dichroic filter and transmits source light. The diffusion film is on one of the first and second transmission windows, and diffuses incident light.

7 Claims, 11 Drawing Sheets

(56) References Cited

U.S. PATENT DOCUMENTS

| | | |
|---|---|---|
| 2014/0211169 A1 | 7/2014 | Kitano et al. |
| 2016/0274446 A1* | 9/2016 | Tanaka ................. G03B 21/204 |
| 2017/0019645 A1 | 1/2017 | Li et al. |
| 2017/0269462 A1 | 9/2017 | Maeda |
| 2018/0149957 A1 | 5/2018 | Maeda |

FOREIGN PATENT DOCUMENTS

| | | |
|---|---|---|
| JP | 2012-212129 | 11/2012 |
| JP | 2014-160227 | 9/2014 |
| JP | 2015-011302 | 1/2015 |
| JP | 2015-094777 | 5/2015 |
| JP | 2016-033553 | 3/2016 |
| JP | 2016-177272 | 10/2016 |
| JP | 2017-513062 | 5/2017 |
| JP | 2017-167528 | 9/2017 |
| JP | 2018-092137 | 6/2018 |
| WO | 2011/092841 | 8/2011 |

OTHER PUBLICATIONS

International Search Report dated Jul. 30, 2019 in International (PCT) Application No. PCT/JP2019/025480 with English translation.

Office Action dated Nov. 30, 2021 in corresponding Chinese Application No. 201980040680.0, with English Machine Translation, 16 pages.

* cited by examiner

PHOSPHOR WHEEL DEVICE

CROSS REFERENCE TO RELATED APPLICATIONS

The present application is a continuation of PCT/JP2019/025480 filed Jun. 26, 2019, which claims priority to Japanese Patent Application No. 2018-125210, filed Jun. 29, 2018, the entire contents of each of which are incorporated herein by reference.

BACKGROUND

1. Technical Field

The present disclosure relates to a phosphor wheel device used in a light source device of a projection image display apparatus, for example, and a light source device and a projection image display apparatus including such a phosphor wheel device.

2. Related Art

Conventionally, a high-pressure mercury lamp having high luminance has been used as a light source for a projection image display apparatus (projector). The high-pressure mercury lamp has problems such as that it cannot be lit instantly and that frequent maintenance is required because the life of the light source is short. On the other hand, with the recent development of a technology related to solid-state light-emitting elements (e.g., semiconductor laser elements, light-emitting diodes, and the like), it has been proposed to use a solid-state light-emitting element as a light source element for a projection image display apparatus as disclosed in JP 2014-160227 A and JP 2016-033553A, for example.

The projection image display apparatus may include, for example, a light source element that generates only light of a single color (referred to as "source light") and a phosphor wheel including a phosphor. In this case, the projection image display apparatus generates source light having a predetermined color component (e.g., blue light) by a light source element, and generates fluorescence containing another color component (e.g., red light and green light) by causing the source light to enter the phosphor wheel. The projection image display apparatus then filters the fluorescence to extract its color components (red light and green light), thereby giving illumination light having desired color components such as red light, green light, and blue light.

The projection image display apparatus causes illumination light to enter a light modulation element such as a digital mirror device (DMD). The light modulation element spatially modulates the illumination light in accordance with an input image signal to generate image light. Finally, the projection image display apparatus projects the image light onto the screen.

SUMMARY

The conversion efficiency of the phosphor is not necessarily 100%, and loss can occur in the phosphor. The transmittance or reflectance of the filter is also not necessarily 100%, and loss can occur in the filter. Therefore, it is required to reduce the loss of the phosphor and/or the filter in order to operate the light source device or the projection image display apparatus including the phosphor wheel with higher efficiency than ever.

An object of the present disclosure is to provide a phosphor wheel device capable of operating a light source device and a projection image display apparatus with higher efficiency than ever. An object of the present disclosure is to further provide a light source device and a projection image display apparatus including such a phosphor wheel device.

The phosphor wheel device according to an aspect of the present disclosure includes a substrate, a first dichroic filter, a phosphor, a first transmission window, a second dichroic filter, a second transmission window, and a diffusion film. The substrate is made of a transparent material and rotatable about an axis of rotation. The substrate has a first region including a circumference having a first radius from the axis of rotation, and a second region including a circumference having a second radius different from the first radius from the axis of rotation. The first dichroic filter is supported by the substrate. The first dichroic filter overlaps with the first region of the substrate in a first direction along the axis of rotation. The first dichroic filter transmits incident light having a first wavelength, and reflects incident light having a second wavelength different from the first wavelength. The phosphor is supported by the substrate. The phosphor overlaps with the first region of the substrate and the first dichroic filter in the first direction. The phosphor is excited by incident light having the first wavelength to generate fluorescence having the second wavelength. The first transmission window is formed on the substrate in a region different from a region of the phosphor in the first region, and transmits incident light. The second dichroic filter is supported by the substrate. The second dichroic filter overlaps with the second region of the substrate in the first direction. The second dichroic filter transmits incident light having the second wavelength, and reflects incident light having the first wavelength. The second transmission window is formed on the substrate in a region different from a region of the second dichroic filter in the second region, and transmits incident light. The diffusion film is formed on one of the first and second transmission windows, and diffuses incident light.

According to the phosphor wheel device according to the present disclosure, it is possible to operate the light source device and the projection image display apparatus with higher efficiency than ever.

DETAILED DESCRIPTION OF EMBODIMENTS

Figure 1:
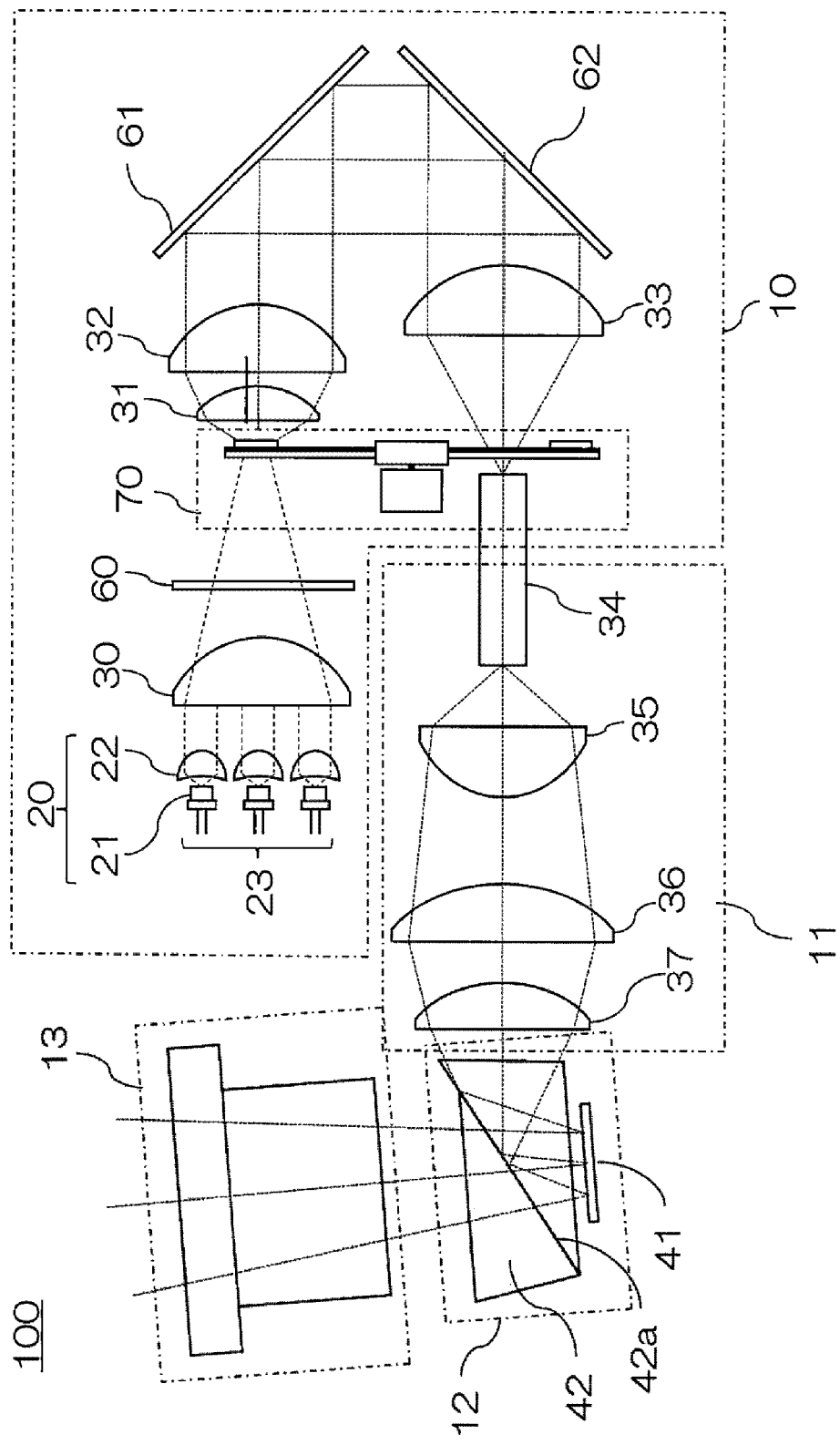
FIG. 1 is a schematic diagram showing the configuration of a projection image display apparatus 100 according to a first embodiment.

Embodiments will be described below in detail with reference to the drawings as appropriate. However, the detailed description more than necessary may be omitted. For example, a detailed description of already well-known matters and a duplicate description of substantially the same configuration may be omitted. This is to avoid unnecessary redundancy in the following description and to facilitate understanding by those skilled in the art. It should be noted that the accompanying drawings and the following description are provided to enable those skilled in the art to fully understand the present disclosure and are not intended to limit the subject matter described in the claims by them.

In the drawings of the phosphor wheel device, the light source device, and the projection image display apparatus according to the embodiments of the present disclosure, the same or similar parts are given the same or similar reference numerals. However, it should be noted that the drawings are schematic and the ratio of each dimension is different from the actual one. Therefore, the specific dimensions and the like should be determined in consideration of the following description. In addition, there can be a part where the relationship or ratio of the dimensions of the drawings is different from each other.

First Embodiment

The projection image display apparatus according to the first embodiment will be described below with reference to FIGS. 1 to 9.

(Outline of Projection Image Display Apparatus 100)

FIG. 1 is a schematic diagram showing the configuration of the projection image display apparatus 100 according to the first embodiment. FIG. 1 shows an optical configuration of the projection image display apparatus 100 in particular. The projection image display apparatus 100 includes a light source device 10, an illumination optical system 11, a modulation device 12, and a projection optical system 13.

The light source device 10 mainly includes a light source 20 that generates source light of a predetermined wavelength and a phosphor wheel 70 that generates fluorescence excited by the source light. As described later, the phosphor wheel 70 includes a phosphor and a dichroic filter that extracts each color component of fluorescence. Thus, the light source device 10 generates illumination light having desired color components such as yellow light, red light, green light, and blue light.

The illumination optical system 11 transmits the illumination light generated by the light source device 10 to the modulation device 12.

The modulation device 12 mainly includes one light modulation element 41 that spatially modulates illumination light in accordance with an input image signal to generate image light.

The projection optical system 13 enlarges and projects the image light onto a screen (not illustrated) outside the projection image display apparatus 100.

In the first embodiment, the phosphor wheel 70 is referred also to as a "phosphor wheel device".

(Configuration of Light Source Device 10)

The light source device 10 includes a light source 20, a condenser lens 30, a diffusion plate 60, the phosphor wheel 70, lenses 31 and 32, mirrors 61 and 62, and a lens 33.

The light source 20 includes a plurality of light source elements 21, and a plurality of collimator lenses 22 that condenses the source light emitted from each light source element 21 into substantially parallel light. In an exemplary embodiment, the light source 20 constitutes an array light source 23 by disposing the plurality of light source elements 21 in an array in order to generate high-brightness illumination light. Each light source element 21 is a semiconductor laser element, for example. In an exemplary embodiment, as each light source element, a semiconductor laser element that generates blue laser light (e.g., a wavelength of 455 nm) having the highest luminous efficiency among the three primary colors of RGB is used. The semiconductor laser element is an example of a solid-state light-emitting element. In order to cool each light source element 21, the light source 20 includes, for example, a heat sink (not illustrated) in contact with each light source element 21 to forcibly air-cool each light source element 21.

The source light emitted from the light source 20 is condensed by the condenser lens 30, and thus superposed on each other, and enters the diffusion plate 60. The diffusion plate 60 reduces the coherence of the source light generated by the light source 20. The source light transmitted through the diffusion plate 60 enters the phosphor wheel 70.

The phosphor wheel 70 includes a phosphor that is excited by incident source light and generates fluorescence having a wavelength different from the wavelength of the source light. The phosphor wheel 70 further includes a diffusion film that is formed in a region different from the region of the phosphor and diffuses incident source light. The phosphor wheel 70 further includes a dichroic filter that transmits the incident fluorescence and reflects the incident source light. The phosphor wheel 70 further includes a transmission window that is formed in a region different from the dichroic filter and transmits incident source light. The details of the phosphor wheel 70 will be described later.

The fluorescence emitted from the phosphor of the phosphor wheel 70 is made substantially parallel by a collimator lens group including the lenses 31 and 32, reflected by the mirrors 61 and 62, condensed by the lens 33, and enters the dichroic filter of the phosphor wheel 70. Each color component of the fluorescence incident on the dichroic filter transmits the dichroic filter and is extracted. Similarly, the source light emitted from the diffusion film of the phosphor wheel 70 is made substantially parallel by the lenses 31 and 32, reflected by the mirrors 61 and 62, condensed by the lens 33, and transmitted through the transmission window of the phosphor wheel 70. The light of each color component transmitted through the dichroic filter (e.g., yellow light, red light, and green light) and the source light transmitted through the transmission window (i.e., blue light) travel to the illumination optical system 11 as illumination light generated by the light source device 10. The light source device 10 generates light (yellow light, red light, green light, and blue light) of each color component of the illumination light in a time-division manner as described later.

A part of the source light incident on the phosphor of the phosphor wheel 70 from the light source 20 passes through the phosphor without being converted into the fluorescence, and enters the dichroic filter of the phosphor wheel 70 via the lenses 31 and 32, the mirrors 61 and 62, and the lens 33. The source light is reflected by the dichroic filter, and again enters the phosphor of the phosphor wheel 70 via the lens 33, the mirrors 62 and 61, and the lenses 32 and 31.

(Configuration of Illumination Optical System 11)

The illumination optical system 11 includes a rod integrator 34, a lens 35, a lens 36, and a lens 37. The illumination light generated by the light source device 10 enters the rod integrator 34. The rod integrator 34 uniformizes the intensity distribution of the illumination light emitted from the light source device 10. The rod integrator 34 may be a solid rod made of a transparent member such as glass, or may be a hollow rod whose inner wall is configured as a mirror surface. The illumination light emitted from the rod integrator 34 is sent to the modulation device 12 via the lens 35, the lens 36, and the lens 37.

(Configuration of Modulation Device 12)

The modulation device 12 includes a light modulation element 41 and a prism 42. The light modulation element 41 is a digital mirror device (DMD) having a plurality of movable micromirrors, for example. The prism 42 includes a dichroic mirror 42a. The dichroic mirror 42a totally reflects the illumination light incident from the illumination optical system 11 and guides it to the light modulation element 41. The light modulation element 41 is controlled by a control circuit (not illustrated) of the projection image display apparatus 100 in accordance with the image signal and in accordance with which color component of the illumination light to be input, and modulates the light of each color component of the illumination light in a time-division manner. The light of each color component of the image light generated by the light modulation element 41 modulating the illumination light transmits the prism 42 and is sent to the projection optical system 13.

(Configuration of Projection Optical System 13)

The projection optical system 13 includes one or a plurality of projection lenses, and enlarges and projects the image light onto a screen (not illustrated) outside the projection image display apparatus 100.

(Phosphor Wheel 70)

Figure 2:
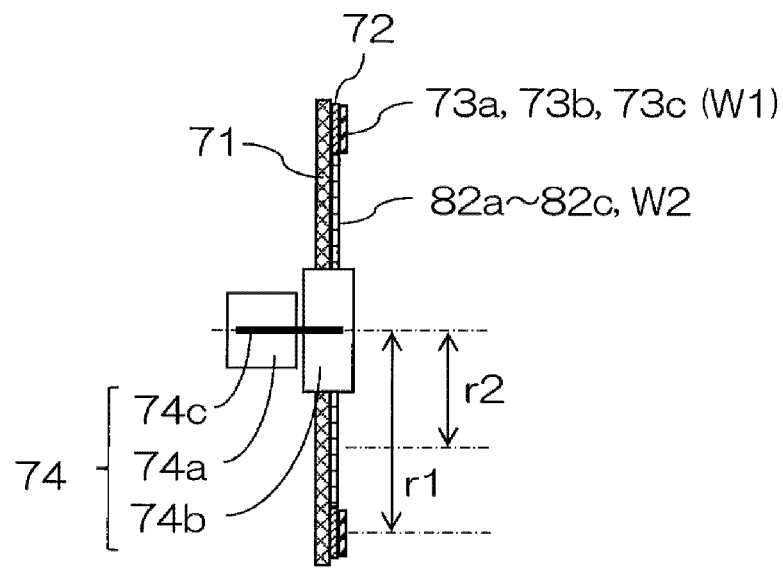
FIG. 2 is a side view showing the configuration of a phosphor wheel 70 of FIG. 1.
Figure 3:
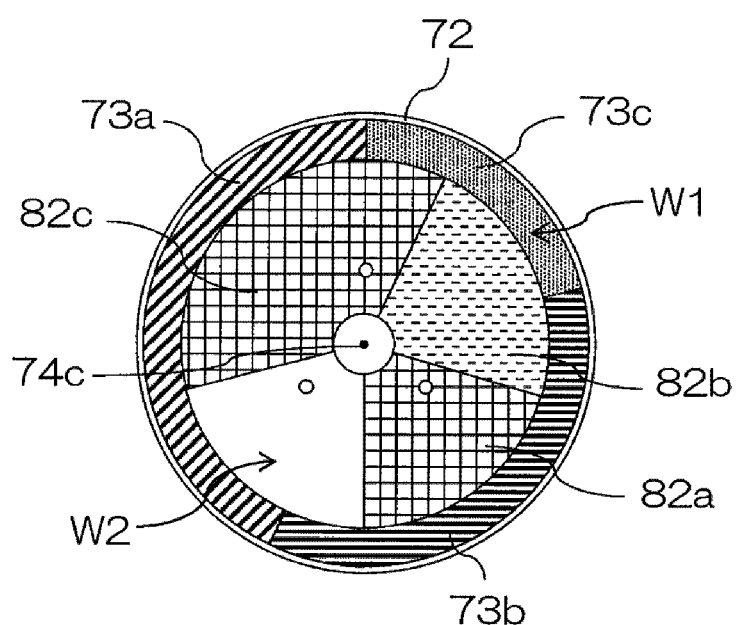
FIG. 3 is a plan view showing the configuration of the phosphor wheel 70 of FIG. 1.

The configuration of the phosphor wheel 70 will be described with reference to FIGS. 2 and 3. FIG. 2 is a side view showing the configuration of the phosphor wheel 70 of FIG. 1. FIG. 3 is a plan view showing the configuration of the phosphor wheel 70 of FIG. 1. FIG. 2 is a cross-sectional view of the phosphor wheel 70 when viewed from the same direction as in FIG. 1. FIG. 3 is a plan view of the phosphor wheel 70 when viewed from the right side of FIG. 2.

The phosphor wheel 70 includes a substrate 71, a dichroic filter 72, phosphors 73a and 73b, a diffusion film 73c, a drive device 74, dichroic filters 82a to 82c, a first transmission window W1, and a second transmission window W2.

The substrate 71 is made of a transparent material and is rotatable about an axis of rotation 74c (described later). The substrate 71 includes a sapphire substrate having a high thermal conductivity, for example.

The dichroic filter 72 is formed in a region of the substrate 71 including a circumference having a radius r1 from the axis of rotation 74c. The dichroic filter 72 transmits the incident light having a wavelength of the source light, and reflects the incident light having a wavelength different from the wavelength of the source light. For example, the dichroic filter 72 transmits incident light in the visible region having a wavelength of 480 nm or less, and reflects incident light in the visible region having a wavelength longer than 480 nm. Thus, the dichroic filter 72 transmits the source light incident from the light source 20, and reflects the fluorescence generated by exciting the phosphors 73a and 73b with the source light.

The phosphors 73a and 73b are each formed on the substrate 71 in a region having a predetermined angular width when viewed from the axis of rotation 74c of a region including the circumference having the radius r1 from the axis of rotation 74c. The phosphors 73a and 73b are excited by incident light having a wavelength of the source light to each generate fluorescence having a wavelength different from the wavelength of the source light.

The transmission window W1 is formed on the substrate 71 in a region different from the regions of the phosphors 73a and 73b of a region including the circumference having the radius r1 from the axis of rotation 74c, and transmits incident light. The diffusion film 73c includes a diffusion material that diffuses incident light, and is formed on the transmission window W1.

The fluorescence generated by the phosphor is itself spatially diffused (i.e., emitted radially from the phosphor). Therefore, of the color components of the illumination light, the light of each color component (e.g., yellow light, red light, and green light; referred to as "fluorescent component light") extracted from the fluorescence is also spatially diffused and has a uniform intensity distribution. On the other hand, the source light generated by the solid-state light-emitting element has a thin light flux. Therefore, of the color components of the illumination light, the light of each color component (e.g., blue light; referred to as "non-fluorescent component light") not extracted from the fluorescence may have a spatially non-uniform intensity distribution concentrated in a specific region. When the light of any color component of the illumination light has a spatially non-uniform intensity distribution, unevenness occurs in the image light. Therefore, by providing the diffusion plate 60 in the front stage of the phosphor wheel 70 and providing the diffusion film 73c in the phosphor wheel 70, the spatial intensity distribution of the non-fluorescent component light is uniformized in accordance with the spatial intensity distribution of the fluorescent component light. Thus, the unevenness of the image light can be reduced.

The phosphors 73a and 73b and the diffusion film 73c may be formed on the dichroic filter 72 as shown in FIG. 2, for example.

The dichroic filters 82a to 82c are formed on the substrate 71 in a region having a predetermined angular width when viewed from the axis of rotation 74c of a region including a circumference having a radius r2 different from the radius r1 from the axis of rotation 74c. The dichroic filters 82a to 82c transmit incident light having a wavelength of light of a predetermined color component of fluorescence and reflect incident light having a wavelength of source light. Thus, the dichroic filters 82a to 82c transmit light of a predetermined color component of the fluorescence generated by the phosphors 73a and 73b, enter the phosphors 73a and 73b of the phosphor wheel 70 from the light source 20 to reflect the source light passing through the phosphors 73a and 73b without being converted into fluorescence.

The transmission window W2 is formed on the substrate 71 in a region different from the dichroic filters 82a to 82c of a region including the circumference having the radius r2, and transmits incident light.

In the examples of FIGS. 2 and 3, the dichroic filters 82a to 82c and the transmission window W2 are formed inside the phosphors 73a and 73b and the diffusion film 73c (i.e., inside of the phosphors 73a and 73b and the transmission window W1) (r1>r2).

Under the control of the control circuit (not illustrated) of the projection image display apparatus 100, the drive device 74 rotates the substrate 71 about the axis of rotation 74c. The drive device 74 includes a motor 74a, an attachment 74b, and the axis of rotation 74c. The substrate 71 is attached to the motor 74a via the attachment 74b. The attachment 74b holds, for example, the substrate 71 with a hub and a holding member and fixes it with screws.

(Phosphors 73a and 73b and Diffusion Film 73c)

The phosphor 73a is applied to a region having a predetermined angular width when viewed from the axis of rotation 74c and excited by blue light having a wavelength of about 455 nm to generate yellow fluorescence including yellow light having a main wavelength of about 570 nm, for example. The phosphor 73b is applied to a region having a predetermined angular width when viewed from the axis of rotation 74c that is a region different from the region of the phosphor 73a, and is excited by blue light having a wavelength of about 455 nm to generate green fluorescence including green light having a main wavelength of about 550 nm, for example. The phosphor 73a includes a mixture of a yellow phosphor that generates yellow fluorescence and a binder. The phosphor 73b includes a mixture of a green phosphor that generates green fluorescence and a binder. The yellow phosphor is $Y_3Al_5O_{12}:Ce^{3+}$, for example. The green phosphor is $Lu_3Al_5O_{12}:Ce^{3+}$, for example. The binder is made of a transparent material such as a silicone resin. The thickness and density of the phosphors 73a and 73b are adjusted so as to transmit light of a desired proportion of incident source light.

In the diffusion film 73c, a mixture of a binder made of a transparent material having a predetermined refractive index and a diffusion material having a refractive index different from the refractive index of the binder is applied to a region having a predetermined angular width when viewed from the axis of rotation 74c. The binder is made of a silicone resin, for example. The diffusion material is a glass bead, for example. The thickness of the diffusion film 73c and the refractive index and the density of the diffusion material are adjusted so as to diffuse the incident source light at a desired angle.

The source light generated by the light source 20 enters the phosphor wheel 70 from the surface of the left side of FIG. 2, and enters the phosphors 73a and 73b and the diffusion film 73c. The drive device 74 rotates the substrate 71 by one in a time corresponding to one frame (e.g., ¹⁄₆₀ seconds) of the image. That is, the source light incident on the phosphor wheel 70 from the light source 20 enters the phosphor 73a, enters the phosphor 73b, and enters the diffusion film 73c in order in a time corresponding to one frame.

The phosphor 73a is excited by the incident source light to generate yellow fluorescence isotropically. The phosphor 73b is excited by the incident source light to generate green fluorescence isotropically. Of the yellow fluorescence and the green fluorescence generated by the phosphors, a part generated leftward in FIG. 2 (orientation opposite to the travel direction (rightward) of the source light incident on the phosphor wheel 70 from the light source 20) is reflected by the dichroic filter 72. Therefore, the fluorescence generated leftward in FIG. 2 is emitted from the surface of the right side of the phosphor wheel 70 together with the fluorescence generated rightward in FIG. 2. The source light incident on the diffusion film 73c is diffused by the diffusion material, diffusively transmitted, and emitted from the surface of the right side of the phosphor wheel 70.

The thus generated yellow fluorescence, green fluorescence, and diffused source light enter the dichroic filters 82a to 82c of the phosphor wheel 70 and the transmission window W2 via the optical system including the lenses 31 and 32, the mirrors 61 and 62, and the lens 33.

(Dichroic Filters 82a to 82c and Transmission Windows W2)

The dichroic filters 82a to 82c and the transmission window W2 are each formed in a fan-shaped region having a predetermined angular width when viewed from the axis of rotation 74c as shown in FIG. 3, for example. The dichroic filters 82a and 82c transmit incident light in the visible region having a wavelength longer than 480 nm, for example, and reflect incident light in the visible region having a wavelength of 480 nm or less. The dichroic filter 82b transmits incident light in the visible region having a wavelength longer than 600 nm, for example, and reflects incident light in the visible region having a wavelength of 600 nm or less. The transmission window W2 transmits the source light diffused by the diffusion film 73c. The transmission window W2 is formed as a region in which the substrate 71 itself is exposed without forming a dichroic filter, for example, in the substrate 71 made of a transparent material.

The phosphor wheel 70 and the optical system including the lenses 31 and 32, the mirrors 61 and 62, and the lens 33 are configured such that yellow fluorescence generated by the phosphor 73a enters the dichroic filters 82a and 82b. Similarly, the phosphor wheel 70 and the associated optical system are configured such that the green fluorescence generated by the phosphor 73b enters the dichroic filter 82c. Similarly, the phosphor wheel 70 and the associated optical system are configured such that the source light diffused by the diffusion material of the diffusion film 73c enters the transmission window W2. Therefore, the sum of the angular widths of the dichroic filters 82a and 82b is set equal to the angular width of the region of the phosphor 73a. The angular width of the dichroic filter 82c is set equal to the angular width of the region of the phosphor 73b. The angular width of the transmission window W2 is set equal to the angular width of the region of the diffusion film 73c (i.e., the region of the transmission window W1).

When the yellow fluorescence from the phosphor 73a enters the dichroic filter 82a, the dichroic filter 82a transmits light having a wavelength longer than 480 nm and reflects light having a wavelength of 480 nm or less, and hence the light source device 10 emits yellow light as illumination light. On the other hand, when the yellow fluorescence from the phosphor 73a enters the dichroic filter 82b, the dichroic filter 82b transmits light having a wavelength longer than 600 nm and reflects light having a wavelength of 600 nm or less, and hence the light source device 10 emits red light as illumination light. When the green fluorescence from the phosphor 73b enters the dichroic filter 82c, the dichroic filter 82c transmits light having a wavelength longer than 480 nm and reflects light having a wavelength of 480 nm or less, and hence the light source device 10 emits green light as illumination light. When the diffused source light (blue light) from the diffusion film 73c enters the transmission window W2, the transmission window W2 transmits blue light, and the light source device 10 emits blue light as illumination light.

(Path Through which Source Light and Fluorescence Travel)

Figure 4:
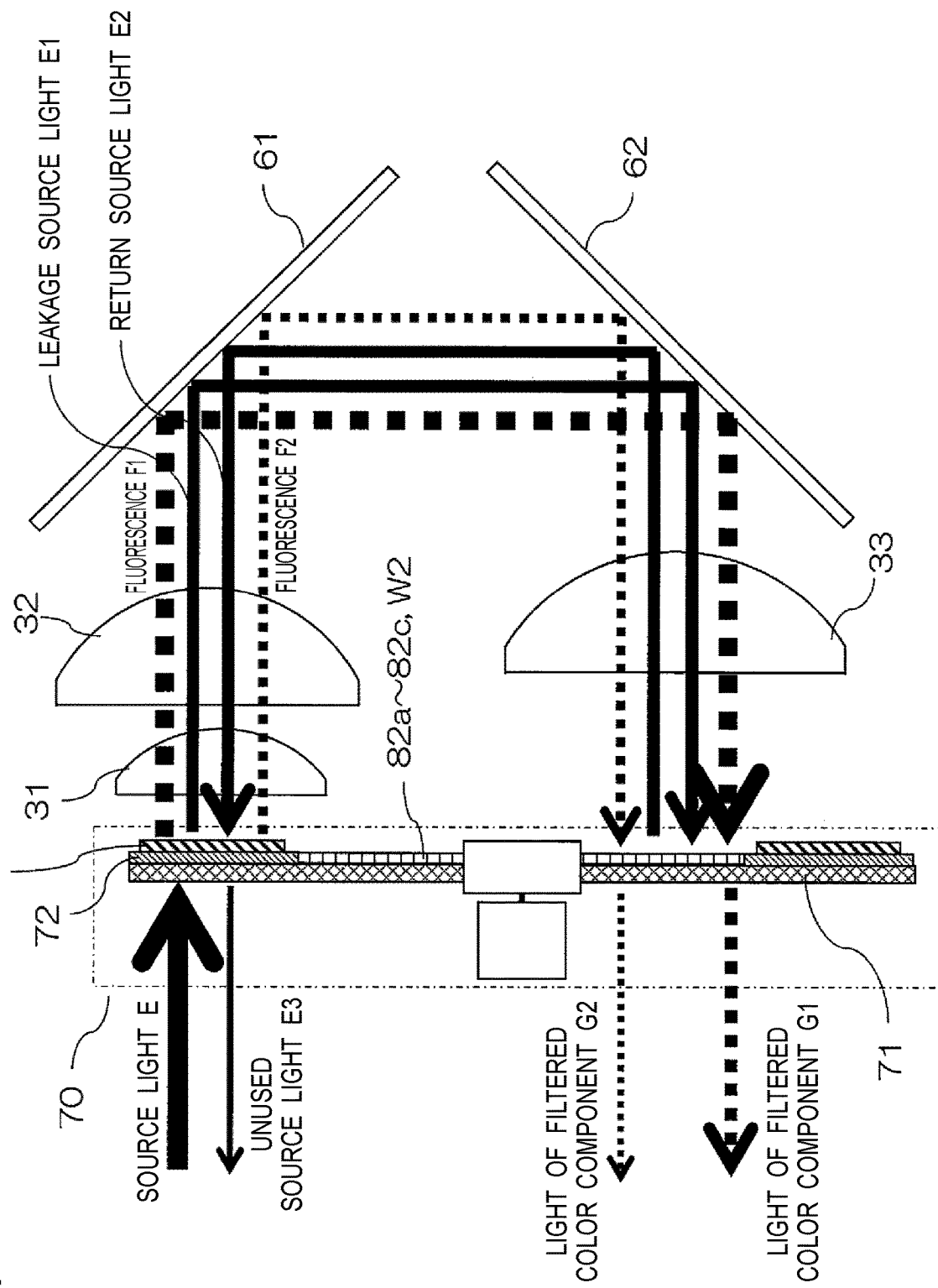
FIG. 4 is a schematic diagram showing a path through which source light and fluorescence travel in a vicinity of the phosphor wheel 70 of FIG. 1.

FIG. 4 is a schematic diagram showing the path through which source light and fluorescence travel in the vicinity of the phosphor wheel 70 of FIG. 1. FIG. 4 is an enlarged conceptual diagram of the phosphor wheel 70 and the associated optical system of the light source device 10 of FIG. 1.

Source light E incident on the phosphor wheel 70 from the light source 20 transmits the substrate 71 and enters the phosphors 73a and 73b. A part of the source light E incident on the phosphors 73a and 73b is absorbed by the phosphors 73a and 73b. A part of the energy of the source light E absorbed by the phosphors 73a and 73b is converted into fluorescence F1 with a predetermined conversion efficiency and is emitted from the phosphors 73a and 73b, and the rest is converted into heat. The source light E not absorbed by the phosphors 73a and 73b transmits the phosphors 73a and 73b and is emitted as leakage source light E1.

The fluorescence F1 and the leakage source light E1 emitted from the phosphors 73a and 73b enter the dichroic filters 82a to 82c via the lenses 31 and 32, the mirrors 61 and 62, and the lens 33. The fluorescence F1 incident on the dichroic filters 82a to 82c is filtered by the dichroic filters 82a to 82c so as to transmit light of a desired color component and so as to reflect light of other color components, and light G1 of a filtered color component is emitted. The leakage source light E1 incident on the dichroic filters 82a to 82c is reflected by the dichroic filters 82a to 82c to become return source light E2, and enters the phosphors 73a and 73b via the lens 33, the mirror 62, the mirror 61, the lens 32, and the lens 31 again.

A part of the return source light E2 incident again on the phosphors 73a and 73b is absorbed by the phosphors 73a and 73b. A part of the energy of the return source light E2 absorbed by the phosphors 73a and 73b is converted into fluorescence F2 with a predetermined conversion efficiency and is emitted from the phosphors 73a and 73b, and the rest is converted into heat. The return source light E2 not absorbed by the phosphors 73a and 73b transmits the phosphors 73a and 73b and the substrate 71, and is emitted from the phosphor wheel 70 as unused source light E3.

The fluorescence F2 emitted from the phosphors 73a and 73b enters the dichroic filters 82a to 82c via the lenses 31 and 32, the mirrors 61 and 62, and the lens 33. The fluorescence F2 incident on the dichroic filters 82a to 82c is filtered by the dichroic filters 82a to 82c so as to transmit light of a desired color component and so as to reflect light of other color components, and light G2 of a filtered color component is emitted.

As a matter of course, the fluorescence F1 and the leakage source light E1 travel along the same path when emitted from the phosphors 73a and 73b and entering the dichroic filters 82a to 82c. Here, the optical system including the lenses 31 and 32, the mirrors 61 and 62, and the lens 33 is configured conjugately between the emission surfaces of the phosphors 73a and 73b and the incident surfaces of the dichroic filters 82a to 82c. Therefore, the return source light E2 travels along the path of the leakage source light E1 in the reverse orientation when emitted from the dichroic filters 82a to 82c and entering the phosphors 73a and 73b. The fluorescence F2 travels along the same path as the path of the fluorescence F1 and the leakage source light E1 when emitted from the phosphors 73a and 73b and entering the dichroic filters 82a to 82c. In FIG. 4, the fluorescence F1, the leakage source light E1, the return source light E2, and the fluorescence F2 are shown at different positions for the purpose of explanation, but in reality, these lights travel along the same path.

When the source light E enters the phosphor 73a, the phosphor 73a generates the fluorescence F1 including yellow light. When the fluorescence F1 including yellow light enters the dichroic filter 82a, the light G1 of the filtered color component includes yellow light, and yellow light is emitted as illumination light. When the fluorescence F1 including yellow light enters the dichroic filter 82b, the light G1 of the filtered color component includes red light, and red light is emitted as illumination light. The leakage source light E1 not absorbed by the phosphor 73a but transmitted the phosphor 73a is reflected by the dichroic filters 82a and 82b to become the return source light E2, and enters the phosphor 73a again. From the part absorbed by the phosphor 73a of the return source light E2 incident on the phosphor 73a, the phosphor 73a generates the fluorescence F2 including yellow light. Similarly to the case of the fluorescence F1, when the fluorescence F2 including yellow light enters the dichroic filter 82a, the light G2 of the filtered color component includes yellow light, and yellow light is emitted as illumination light. When the fluorescence F2 including yellow light enters the dichroic filter 82b, the light G2 of the filtered color component includes red light, and red light is emitted as illumination light. The part not absorbed by the phosphor 73a of the return source light E2 incident on the phosphor 73a is emitted from the phosphor wheel 70 as the unused source light E3.

When the source light E enters the phosphor 73b, the phosphor 73b generates the fluorescence F1 including green light. When the fluorescence F1 including green light enters the dichroic filter 82c, the light C1 of the filtered color component includes green light, and green light is emitted as illumination light. The leakage source light E1 not absorbed by the phosphor 73b but transmitted the phosphor 73b is reflected by the dichroic filter 82c to become the return source light E2, and enters the phosphor 73b again. From the part absorbed by the phosphor 73b of the return source light E2 incident on the phosphor 73b, the phosphor 73b generates the fluorescence F2 including green light. Similarly to the case of the fluorescence F1, when the fluorescence F2 including green light enters the dichroic filter 82c, the light G2 of the filtered color component includes green light, and green light is emitted as illumination light. The part not absorbed by the phosphor 73b of the return source light E2 incident on the phosphor 73b is emitted from the phosphor wheel 70 as the unused source light E3.

When the source light E enters the diffusion film 73c, the diffused source light E enters and transmits the transmission window W2, and blue light is emitted as illumination light.

Effects of First Embodiment

According to the phosphor wheel 70 according to the first embodiment, by including the dichroic filters 72 and 82a to 82c, as shown in FIG. 4, the source light not absorbed by the phosphors 73a and 73b is caused to enter the phosphors 73a and 73b again, and the conversion efficiency from the source light to the fluorescence can be improved. Therefore, it is possible to operate the light source device 10 and the projection image display apparatus 100 including the phosphor wheel 70 with higher efficiency than ever.

In general, when a projection image display apparatus includes a light source for non-fluorescent component light separately from a light source for fluorescent component light, it is relatively easy to provide a diffusion plate in the path of the non-fluorescent component light. On the other hand, when the fluorescent component light and the non-fluorescent component light are generated from a common light source and travel along a common path without branching on the way, it is difficult to provide a diffusion plate in the path of the non-fluorescent component light without affecting the fluorescent component light. However, the phosphor wheel 70 according to the first embodiment includes the diffusion film 73c formed on the substrate 71, and hence it is possible to diffuse light of a desired color component (blue light) without affecting light of other color components (yellow light, red light, and green light).

According to the phosphor wheel 70 according to the first embodiment, since the phosphors 73a and 73b and the diffusion film 73c are each formed in a region of a predetermined angular width on the surface of the substrate 71, even when the fluorescent component light and the non-fluorescent component light are generated from a common light source and travel along a common path, it is not necessary to separately provide a wheel device for filtering the fluorescence. This can reduce the size and cost of the light source device and the projection image display apparatus.

According to the phosphor wheel 70 according to the first embodiment, since the phosphors 73a and 73b and the diffusion film 73c are each applied and formed in a region having the equal radius r1 from the axis of rotation 74c on the surface of the substrate 71, and hence the weight balance of the phosphor wheel 70 is uniformized. Therefore, it is possible to easily adjust the balance at the time of rotation.

According to the phosphor wheel 70 according to the first embodiment, since the phosphors 73a and 73b, the diffusion film 73c, the dichroic filters 82a to 82c, and the transmission windows W1 and W2 are integrated on the single substrate 71, it is possible to provide a highly durable phosphor wheel device.

Modification of First Embodiment

Figure 5:
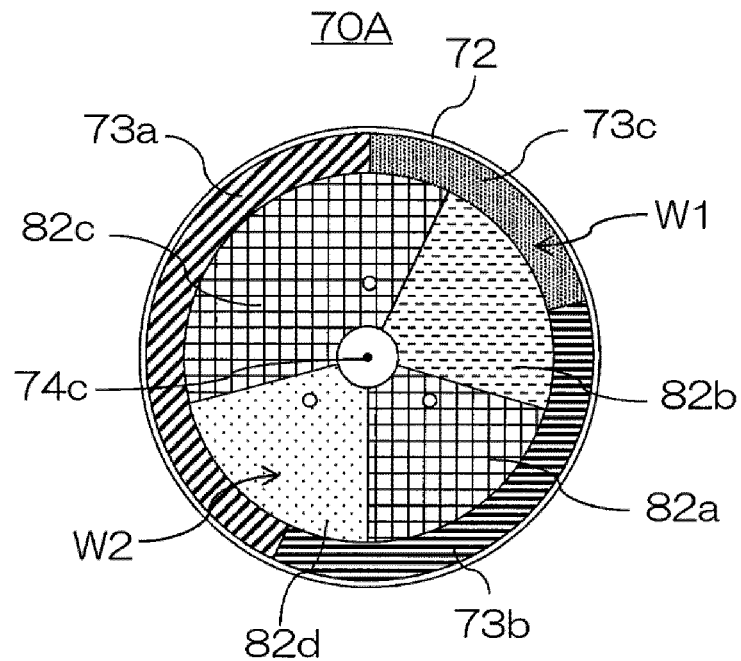
FIG. 5 is a plan view showing the configuration of a phosphor wheel 70A according to a first modification of the first embodiment.

FIG. 5 is a plan view showing the configuration of a phosphor wheel 70A according to the first modification of the first embodiment. The phosphor wheel 70A includes an antireflection film 82d formed on the transmission window W2, in addition to each component of the phosphor wheel 70 of FIG. 1. Thus, it is possible to reduce the loss when the source light transmits the transmission window W2, and it is possible to operate the light source device 10 and the projection image display apparatus 100 including the phosphor wheel 70A with higher efficiency.

Figure 6:
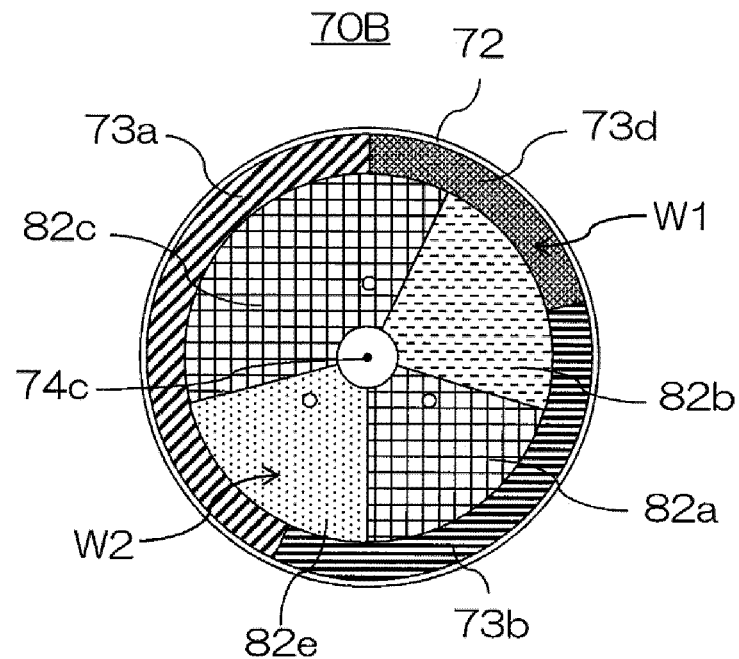
FIG. 6 is a plan view showing the configuration of a phosphor wheel 70B according to a second modification of the first embodiment.

FIG. 6 is a plan view showing the configuration of a phosphor wheel 70B according to the second modification of the first embodiment. The phosphor wheel 70B includes a diffusion film 73d in place of the diffusion film 73c of FIG. 1, and further includes a filter 82e formed on the transmission window W2. The diffusion film 73d is formed of a mixture of a binder made of a transparent material having a predetermined refractive index, a diffusion material having a refractive index different from the refractive index of the binder, and a phosphor excited by source light to generate fluorescence having a wavelength different from the wavelength of the source light. Thus, the diffusion film 73d diffuses the incident source light and generates fluorescence excited by the source light. The filter 82e transmits the diffused source light and the excited fluorescence that are emitted from the diffusion film 73d. The filter 82e may be, for example, a dichroic filter having a characteristic of transmitting light having a wavelength of 500 nm or less and reflecting light having a wavelength larger than 500 nm. The chromaticity of the blue light emitted as illumination light from the light source device 10 can be changed by transmitting the source light and light of a color component of 500 nm or less of the fluorescence excited by the source light in the diffusion film 73d.

Figure 7:
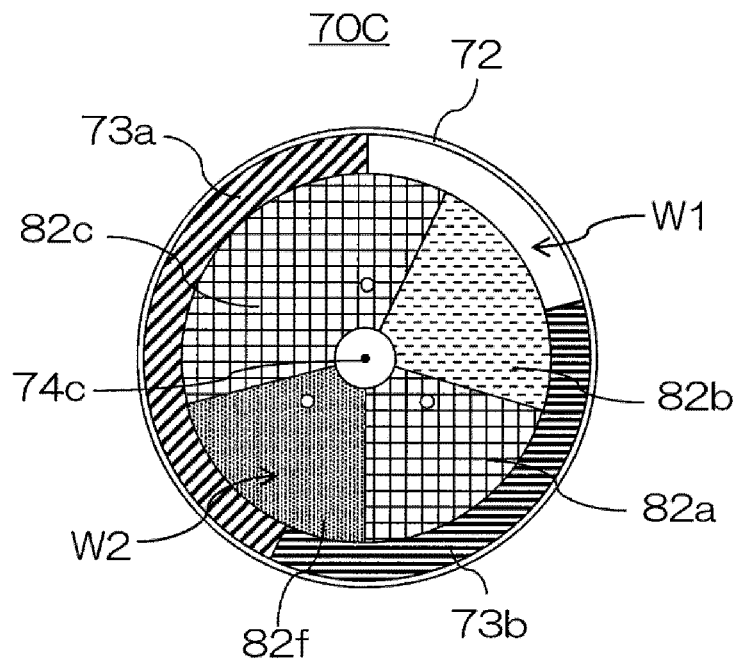
FIG. 7 is a plan view showing the configuration of a phosphor wheel 70C according to a third modification of the first embodiment.

FIG. 7 is a plan view showing the configuration of a phosphor wheel 70C according to the third modification of the first embodiment. The phosphor wheel 70C includes a diffusion film 82f formed on the transmission window W2 in place of the diffusion film 73c formed on the transmission window W1 in FIG. 2. The diffusion film may be formed on either of the transmission windows W1 and W2, and can diffuse blue light without affecting light of other color components. This can improve the degree of freedom in designing the light source device 10 and the projection image display apparatus 100.

Figure 8:
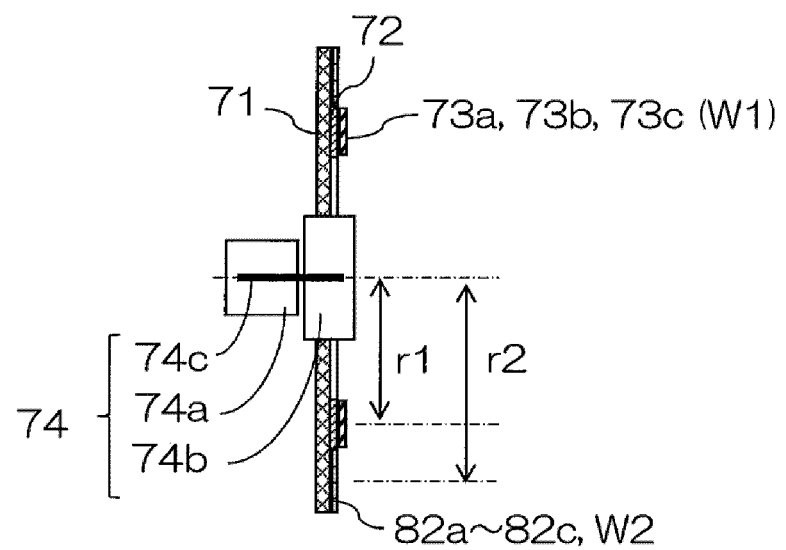
FIG. 8 is a side view showing the configuration of a phosphor wheel 70D according to a fourth modification of the first embodiment.
Figure 9:
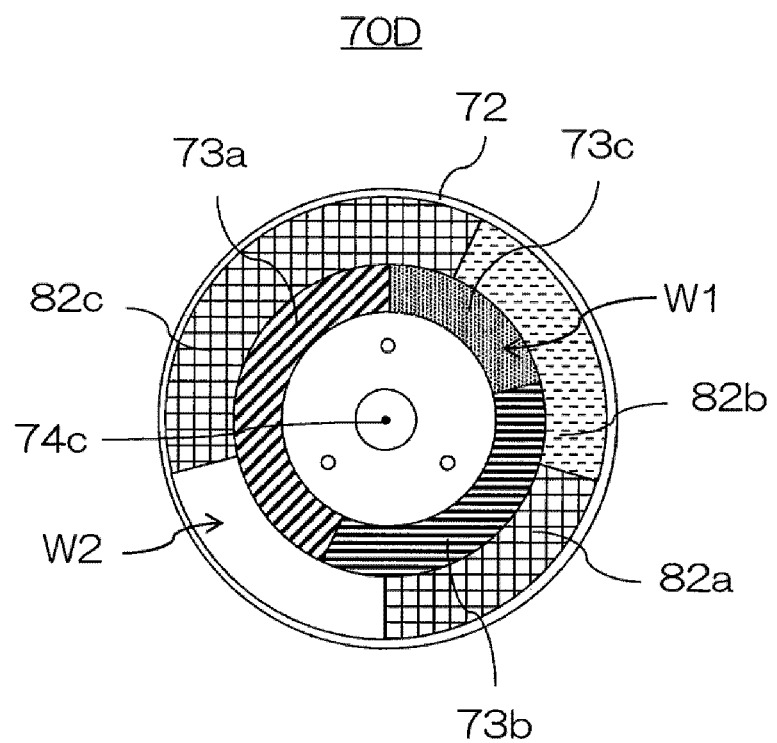
FIG. 9 is a plan view showing the configuration of the phosphor wheel 70D of FIG. 8.

FIG. 8 is a side view showing the configuration of a phosphor wheel 70D according to the fourth modification of the first embodiment. FIG. 9 is a plan view showing the configuration of the phosphor wheel 70D of FIG. 8. The dichroic filters 82a to 82c and the transmission window W2 may be formed inside the phosphors 73a and 73b and the diffusion film 73c as shown in FIGS. 2 and 3, or may be formed outside the phosphors 73a and 73b and the diffusion film 73c as shown in FIGS. 8 and 9 (r1<r2).

The phosphors 73a and 73b and the diffusion film 73c may be formed on the same side as the dichroic filter 72 of the substrate 71 as shown in FIGS. 2 and 3, or may be formed on the opposite side.

Summary of First Embodiment

The phosphor wheel device, the light source device, and the projection image display apparatus according to the first embodiment have the following configuration.

According to the phosphor wheel device according to the first embodiment, the phosphor wheel 70 includes the substrate 71, the first dichroic filter 72, the phosphors 73a and 73b, the first transmission window W1, the second dichroic filters 82a to 82c, the second transmission window W2, and the diffusion film 73c. The substrate 71 is made of a transparent material and is rotatable about the axis of rotation. The dichroic filter 72 is formed on the substrate 71 in a region including a circumference having the first radius r1 from the axis of rotation, transmits incident light having the first wavelength, and reflects incident light having the second wavelength different from the first wavelength. The phosphors 73a and 73b are phosphors formed on the substrate 71 in a region having a predetermined angular width when viewed from the axis of rotation of a region including a circumference having the first radius r1 from the axis of rotation, and is excited by incident light having the first wavelength to generate fluorescence having the second wavelength. The first transmission window W1 is formed on the substrate 71 in a region different from the regions of the phosphors 73a and 73b of a region including the circumference having the first radius r1 from the axis of rotation, and transmits incident light. The dichroic filters 82a to 82c are formed on the substrate 71 in a region having a predetermined angular width when viewed from the axis of rotation of a region including a circumference having the second radius r2 different from the first radius r1 from the axis of rotation, transmits incident light having the second wavelength, and reflects incident light having the first wavelength. The second transmission window W2 is formed on the substrate 71 in a region different from the dichroic filters 82a to 82c of a region including the circumference having the second radius r2, and transmits incident light. The diffusion film 73c is formed on one of the first transmission window W1 and the second transmission window W2, and diffuses incident light.

Thus, by including the dichroic filters 72 and 82a to 82c, the source light not absorbed by the phosphors 73a and 73b is caused to enter the phosphors 73a and 73b again, and the conversion efficiency from the source light to the fluorescence can be improved. Therefore, it is possible to operate the light source device 10 and the projection image display apparatus 100 including the phosphor wheel 70 with higher efficiency than ever.

According to the phosphor wheel device according to the first embodiment, the diffusion film 73c may be formed of a mixture of a binder made of a transparent material having a predetermined refractive index and a diffusion material having a refractive index different from the refractive index of the binder. Of the first transmission window W1 and the second transmission window W2, the transmission window W2 in which the diffusion film 73c is not formed may have an antireflection film.

Thus, the spatial intensity distribution of the non-fluorescent component light is uniformized in accordance with the spatial intensity distribution of the fluorescent component light, and the unevenness of the image light can be reduced.

According to the phosphor wheel device according to the first embodiment, the diffusion film 73c may be formed of a mixture of a binder made of a transparent material having a predetermined refractive index, a diffusion material having a refractive index different from the refractive index of the binder, and a phosphor excited by incident light having the first wavelength to generate fluorescence having a third wavelength different from the first wavelength. Of the first transmission window W1 and the second transmission window W2, the transmission window W2 in which the diffusion film 73c is not formed may have a filter that transmits incident light having the first and third wavelengths.

Thus, the chromaticity of the blue light emitted as illumination light from the light source device 10 including the phosphor wheel 70 can be changed.

The light source device 10 according to the first embodiment includes the above-described phosphor wheel 70, the drive device 74 that rotates the phosphor wheel 70, and the light source element 21 that generates source light of the first wavelength. The light source device 10 further includes an optical system that guides the fluorescence excited by the source light incident on the phosphors 73a and 73b from the light source element 21 or the source light incident on the diffusion film 73c from the light source element 21 and diffused by the diffusion film 73c so as to enter the dichroic filters 82a to 82c or the second transmission window W2.

Thus, it is possible to operate the light source device 10 including the phosphor wheel 70 with higher efficiency than ever.

The projection image display apparatus 100 according to the first embodiment includes the light source device 10 described above.

Thus, it is possible to operate the projection image display apparatus 100 including the phosphor wheel 70 with higher efficiency than ever.

Second Embodiment

The projection image display apparatus according to the second embodiment will be described below with reference to FIGS. 10 to 17. Hereinafter, differences from the projection image display apparatus according to the first embodiment will be mainly described. Parts having the same configurations as those of the first embodiment are given the same reference numerals, and detailed description thereof will be omitted.

(Outline of Projection Image Display Apparatus 100E)

Figure 10:
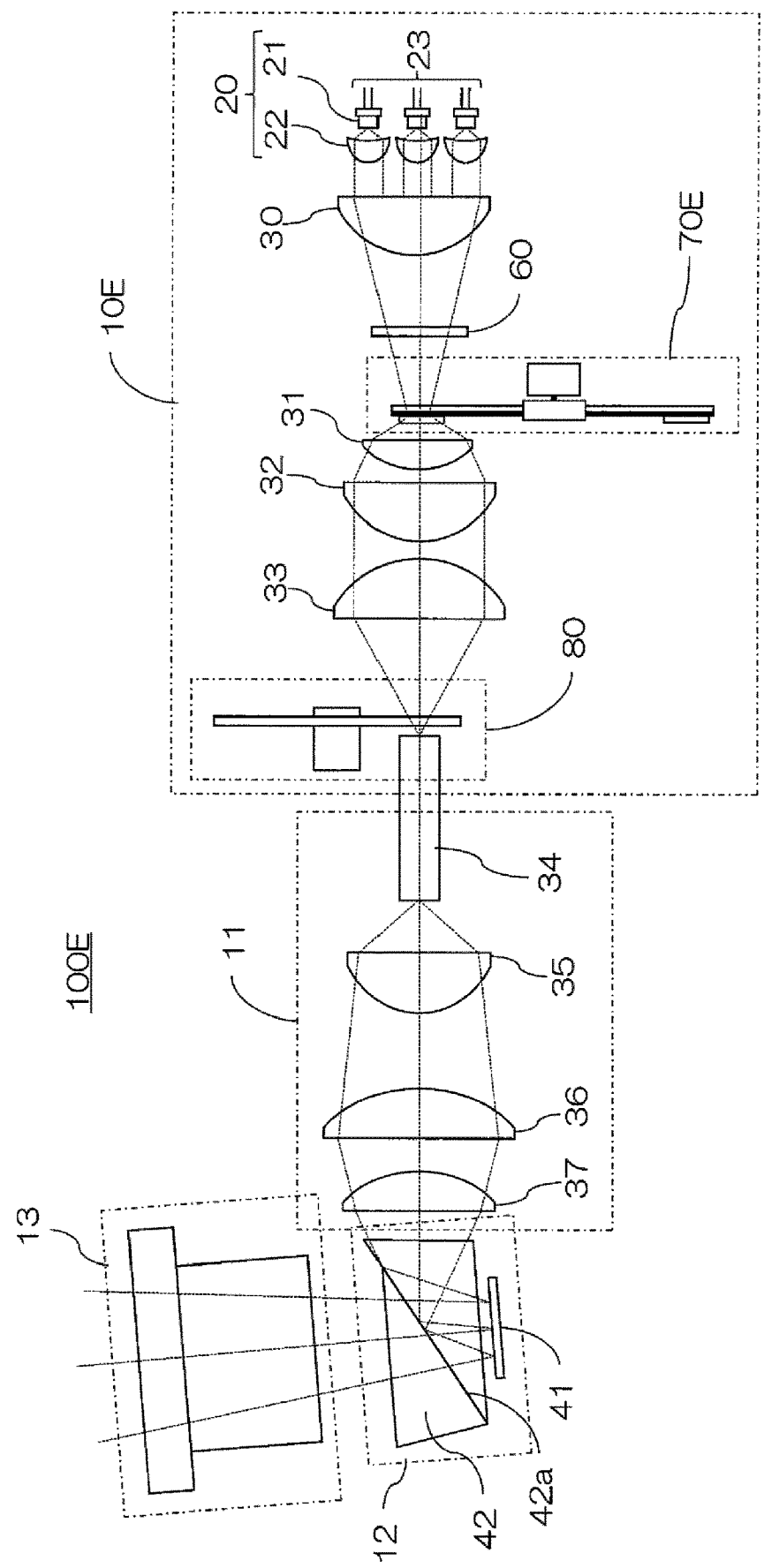
FIG. 10 is a schematic diagram showing the configuration of a projection image display apparatus 100E according to a second embodiment.

FIG. 10 is a schematic diagram showing the configuration of a projection image display apparatus 100E according to the second embodiment. The projection image display apparatus 100E includes a light source device 10E in place of the light source device 10 of FIG. 1. The light source device 10E includes a phosphor wheel 70E, in place of the phosphor wheel 70 of FIG. 1, and a filter wheel 80.

The first embodiment shows a case where the phosphors 73a and 73b are formed on the single phosphor wheel 70 and the dichroic filters 82a to 82c that extract respective color components of fluorescence are formed, and this is an effective configuration for miniaturizing the optical system. On the other hand, in the second embodiment, a case of providing the filter wheel 80 where a dichroic filter that extracts each color component of fluorescence is formed separately from the phosphor wheel 70E in which a phosphor is formed.

In the second embodiment, a set of the phosphor wheel 70E and the filter wheel 80 is collectively referred also to as a "phosphor wheel device".

(Configuration of Light Source Device 10E)

The light source device 10E includes the light source 20, the condenser lens 30, the diffusion plate 60, the phosphor wheel 70E, the lens 31, the lens 32, the lens 33, and the filter wheel 80.

The source light emitted from the light source 20 enters the phosphor wheel 70E via the condenser lens 30 and the diffusion plate 60.

The phosphor wheel 70E includes a phosphor that is excited by incident source light and generates fluorescence having a wavelength different from the wavelength of the source light. The phosphor wheel 70E further includes a diffusion film that is formed in a region different from the region of the phosphor and diffuses incident source light. The details of the phosphor wheel 70E will be described later.

The fluorescence emitted from the phosphor of the phosphor wheel 70E enters the filter wheel 80 via the lenses 31 and 32, the mirrors 61 and 62, and the lens 33. Similarly, the source light emitted from the diffusion film of the phosphor wheel 70E enters the filter wheel 80 via the lenses 31 and 32, the mirrors 61 and 62, and the lens 33.

The filter wheel 80 includes a dichroic filter that transmits the incident fluorescence and reflects the incident source light. The filter wheel 80 further includes a transmission window that is formed in a region different from the dichroic filter and transmits incident source light. The details of the filter wheel 80 will be described later.

Each color component of the fluorescence incident on the dichroic filter of the filter wheel 80 transmits the dichroic filter and is extracted. The source light emitted from the diffusion film of the phosphor wheel 70E and entering the filter wheel 80 transmits the transmission window of the filter wheel 80. The light of each color component transmitted through the dichroic filter (e.g., yellow light, red light, and green light) and the source light transmitted through the transmission window (i.e., blue light) travel to the illumination optical system 11 as illumination light generated by the light source device 10E.

Thereafter, the illumination optical system 11, the modulation device 12, and the projection optical system 13 of FIG. 10 operate similarly to the corresponding components of FIG. 1.

(Configuration of Phosphor Wheel 70E)

Figure 11:
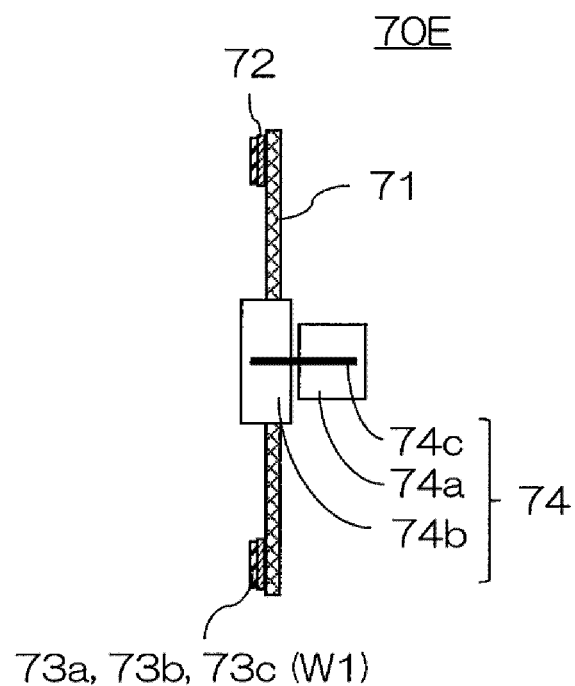
FIG. 11 is a side view showing the configuration of a phosphor wheel 70E of FIG. 10.
Figure 12:
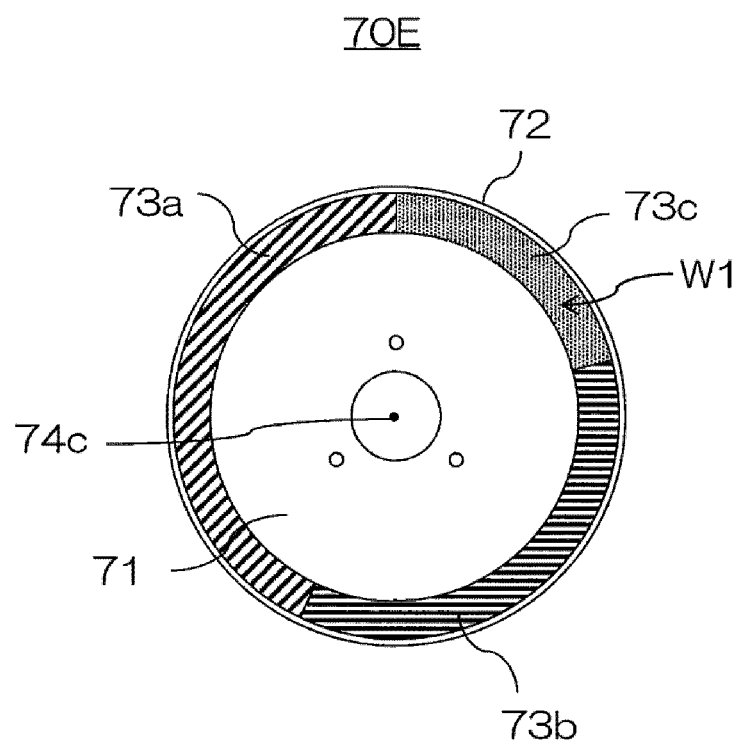
FIG. 12 is a plan view showing the configuration of the phosphor wheel 70E of FIG. 10.

The configuration of the phosphor wheel 70E will be described with reference to FIGS. 11 and 12. FIG. 11 is a side view showing the configuration of the phosphor wheel 70E of FIG. 10. FIG. 12 is a plan view showing the configuration of the phosphor wheel 70E of FIG. 10. FIG. 11 is a cross-sectional view of the phosphor wheel 70E when viewed from the same direction as in FIG. 10. FIG. 12 is a plan view of the phosphor wheel 70E when viewed from the left side of FIG. 10. The phosphor wheel 70E has a configuration in which the dichroic filters 82a to 82c and the transmission window W2 are removed from the phosphor wheel 70 of FIGS. 2 and 3.

(Filter Wheel 80)

Figure 13:
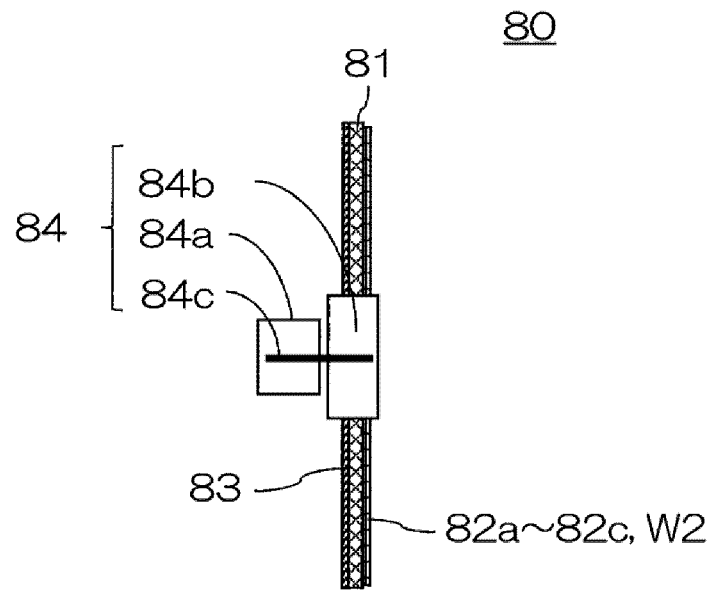
FIG. 13 is a side view showing the configuration of a filter wheel 80 of FIG. 10.
Figure 14:
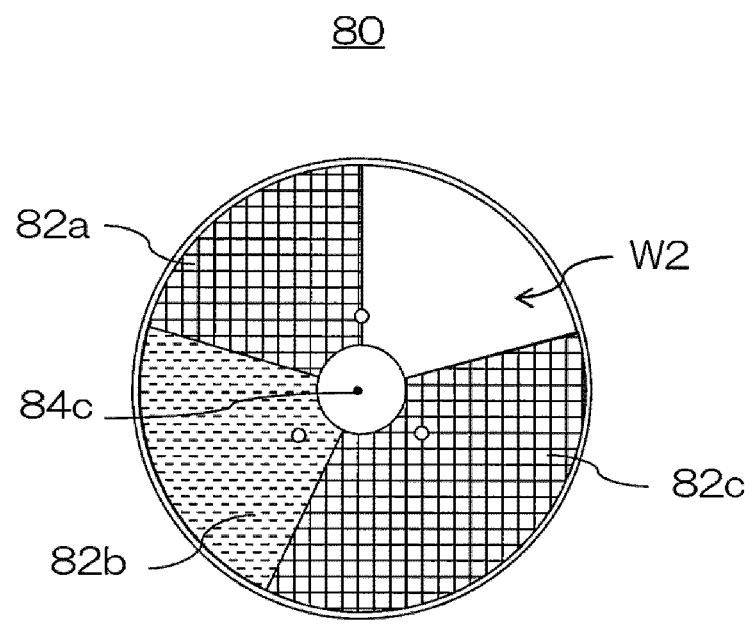
FIG. 14 is a plan view showing the configuration of the filter wheel 80 of FIG. 10.

The configuration of the filter wheel 80 will be described with reference to FIGS. 13 and 14. FIG. 13 is a side view showing the configuration of the filter wheel 80 of FIG. 10. FIG. 14 is a plan view showing the configuration of the filter wheel 80 of FIG. 10. FIG. 13 is a cross-sectional view of the filter wheel 80 when viewed from the same direction as in FIG. 10. FIG. 14 is a plan view of the filter wheel 80 when viewed from the right side of FIG. 10.

The filter wheel 80 includes a substrate 81, the dichroic filters 82a to 82c, the transmission window W2, an antireflection film 83, and a drive device 84.

The substrate 81 is made of a transparent material and is rotatable about an axis of rotation 84c (described later). The substrate 81 includes a glass substrate having high transmittivity over the entire band of visible light, for example.

The dichroic filters 82a to 82c are formed on the substrate 81 in a region having a predetermined angular width when viewed from the axis of rotation 84c. The dichroic filters 82a to 82c transmit incident light having a wavelength of light of a predetermined color component of fluorescence and reflect incident light having a wavelength of source light. Thus, the dichroic filters 82a to 82c transmit light of a predetermined color component of the fluorescence generated by the phosphors 73a and 73b, enter the phosphors 73a and 73b of the phosphor wheel 70 from the light source 20 to reflect the source light passing through the phosphors 73a and 73b without being converted into fluorescence.

The transmission window W2 is formed on the substrate 81 in a region different from the dichroic filters 82a to 82c, and transmits incident light.

The dichroic filters 82a to 82c and the transmission window W2 of the filter wheel 80 are configured substantially similar to the corresponding components of FIGS. 2 and 3.

The antireflection film 83 transmits the light of each color component transmitted the dichroic filters 82a to 82c and the source light transmitted the transmission window W2, and emits the light from the filter wheel 80. In the filter wheel 80, the antireflection film 83 is formed on the side opposite to the dichroic filters 82a to 82c. For example, in the filter wheel 80, the dichroic filters 82a to 82c may be formed on a surface (i.e., surface of the right side of FIG. 13) on which fluorescence and source light enter from the phosphor wheel 70E, and the antireflection film 83 may be formed on a surface (i.e., surface of the left side of FIG. 13) on which the light of each color component transmitted the dichroic filters 82a to 82c and the source light transmitted the transmission window W2 are emitted.

Under the control of the control circuit (not illustrated) of the projection image display apparatus 100E, the drive device 84 rotates the substrate 81 about the axis of rotation 84c. The drive device 84 includes a motor 84a, an attachment 84b, and the axis of rotation 84c. The substrate 81 is attached to the motor 84a via the attachment 84b. The attachment 84b holds, for example, the substrate 81 with a hub and a holding member and fixes it with screws.

The light source device 10E is configured such that the yellow fluorescence generated by the phosphor 73a enters the dichroic filters 82a and 82b, the green fluorescence generated by the phosphor 73b enters the dichroic filter 82c, and the source light diffused by the diffusion material of the diffusion film 73c enters the transmission window W2. Therefore, similarly to the first embodiment, the sum of the angular widths of the dichroic filters 82a and 82b is set equal to the angular width of the region of the phosphor 73a. The angular width of the dichroic filter 82 c is set equal to the angular width of the region of the phosphor 73b. The angular width of the transmission window W2 is set equal to the angular width of the region of the diffusion film 73c (i.e., the region of the transmission window W1). Furthermore, the phosphor wheel 70E and the filter wheel 80 have a predetermined phase difference from each other and are rotated synchronously with each other at the same rotation speed.

(Path Through which Source Light and Fluorescence Travel)

Figure 15:
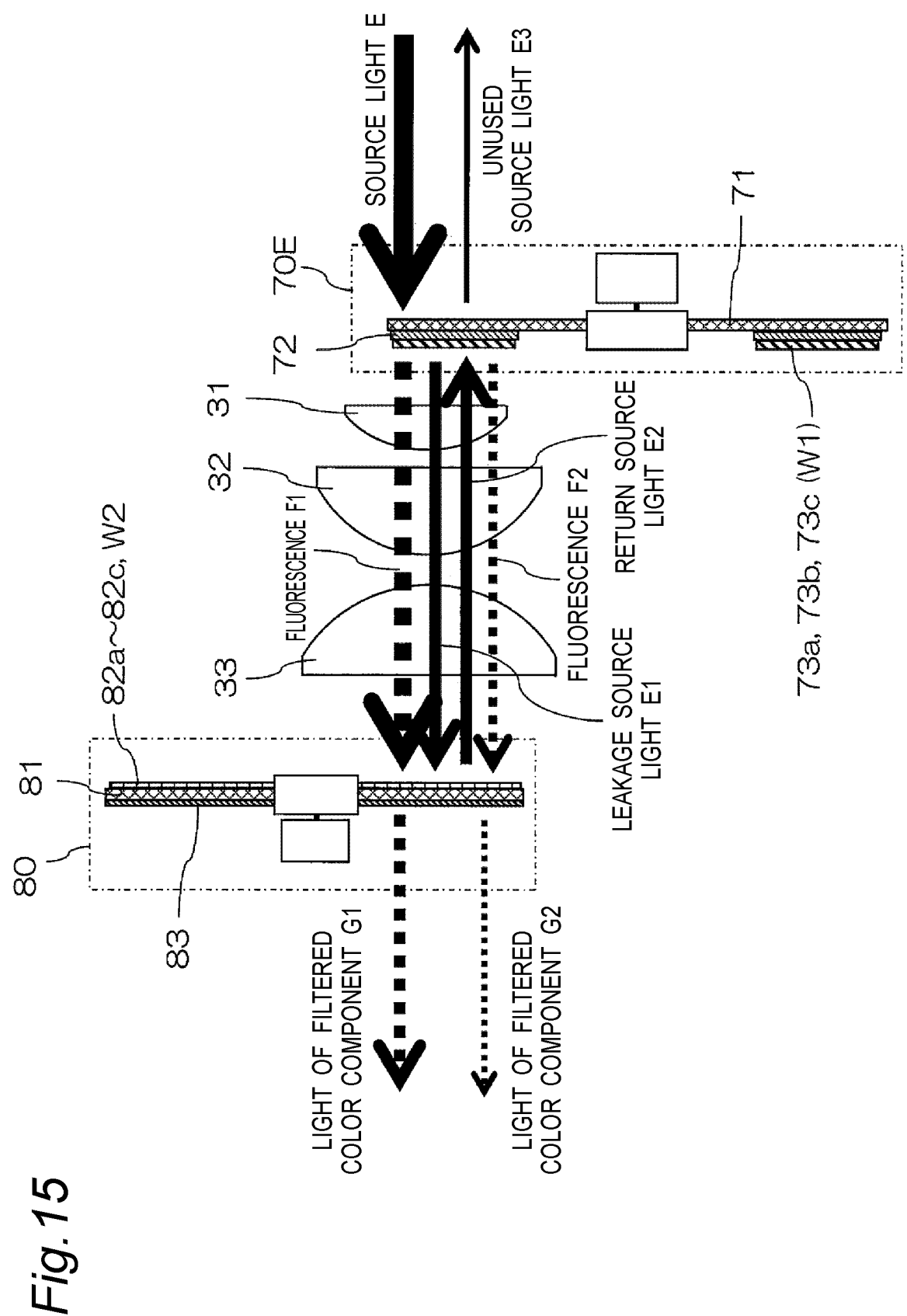
FIG. 15 is a schematic diagram showing a path through which excitation light and fluorescence travel in a vicinity of the phosphor wheel 70E and the filter wheel 80 of FIG. 10.

FIG. 15 is a schematic diagram showing a path through which excitation light and fluorescence travel in the vicinity of the phosphor wheel 70E and the filter wheel 80 of FIG. 10. FIG. 15 is an enlarged conceptual diagram of the phosphor wheel 70E, the filter wheel 80, and the associated optical system of the light source device 10E of FIG. 10.

Also in the case of FIG. 15, similarly to the case of FIG. 4, the leakage source light E1 is reflected by the dichroic filters 82a to 82c to become the return source light E2, and enters the phosphors 73a and 73b again. From the part absorbed by the phosphors 73a and 73b of the return source light E2 incident on the phosphors 73a and 73b, the phosphors 73a and 73b generate the fluorescence F2. Due to this, similarly to the case of the first embodiment, the source light not absorbed by the phosphors 73a and 73b is caused to enter the phosphors 73a and 73b again, and the conversion efficiency from the source light to the fluorescence can be improved.

Effects of Second Embodiment

Conventionally, most filter wheel devices that filter fluorescence and extract its color components have a configuration in which a fan-shaped filter plate and a diffusion plate are arrayed and fixed. They have been high in cost and difficult to realize sufficiently high durability. According to the light source device 10E according to the second embodiment, by providing the phosphor wheel 70E with the diffusion film 73c, it is not necessary to provide the filter wheel 80 with the light diffusion function, and hence it is possible to reduce the cost and improve the durability.

Modification of Second Embodiment

Figure 17:
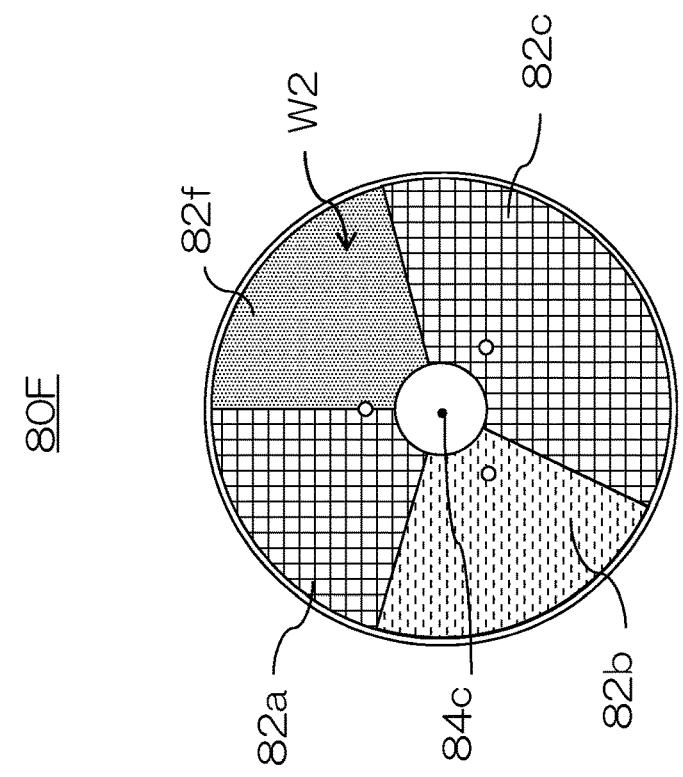
FIG. 17 is a plan view showing the configuration of a filter wheel 80F according to the modification of the second embodiment.
Figure 16:
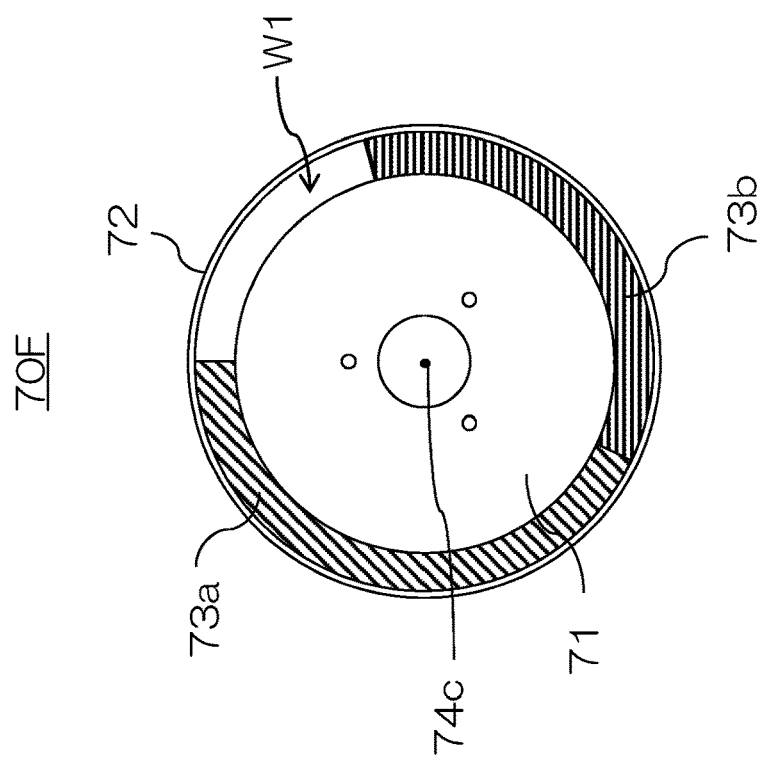
FIG. 16 is a plan view showing the configuration of a phosphor wheel 70F according to a modification of the second embodiment.

FIG. 16 is a plan view showing the configuration of a phosphor wheel 70F according to a modification of the second embodiment. FIG. 17 is a plan view showing the configuration of a filter wheel 80F according to the modification of the second embodiment. The phosphor wheel 70F has a configuration in which the diffusion film 73c of the phosphor wheel 70E of FIG. 11 is removed. The filter wheel 80F includes a diffusion film 82f formed on the transmission window W2, in addition to each component of the filter wheel 80 of FIG. 11. As described above, the diffusion film may be formed on either of the transmission windows W1 and W2, and can diffuse blue light without affecting light of other color components. This can improve the degree of freedom in designing the light source device 10E and the projection image display apparatus 100E.

As described with reference to FIG. 5, the filter wheel 80 of FIG. 11 may include an antireflection film formed on the transmission window W2.

As described with reference to FIG. 6, the diffusion film 73c of the phosphor wheel 70E of FIG. 11 may be replaced with a diffusion film formed of a mixture of a binder, a diffusion material, and a phosphor, and the filter wheel 80 of FIG. 11 may include a filter formed on the transmission window W2.

Summary of Second Embodiment

The phosphor wheel device, the light source device, and the projection image display apparatus according to the second embodiment have the following configurations.

The phosphor wheel device according to the second embodiment includes a first substrate 71, the dichroic filter 72, the phosphors 73a and 73b, the first transmission window W1, a second substrate 81, the dichroic filters 82a to 82c, the second transmission window W2, and the diffusion film 73c. The first substrate 71 is made of a transparent material and is rotatable about the first axis of rotation. The dichroic filter 72 is formed on the first substrate 71 in a region including a circumference having the first radius r1 from the first axis of rotation, transmits incident light having the first wavelength, and reflects incident light having the second wavelength different from the first wavelength. The phosphors 73a and 73b are phosphors formed on the first substrate 71 in a region having a predetermined angular width when viewed from the first axis of rotation of a region including a circumference having the first radius r1 from the first axis of rotation, and is excited by incident light having the first wavelength to generate fluorescence having the second wavelength. The first transmission window W1 is formed on the first substrate 71 in a region different from the regions of the phosphors 73a and 73b of a region including the circumference having the first radius r1 from the first axis of rotation, and transmits incident light. The second substrate 81 is made of a transparent material and is rotatable about the second axis of rotation. The dichroic filters 82a to 82c are formed on the second substrate 81 in a region having a predetermined angular width when viewed from the second axis of rotation, transmits incident light having the second wavelength, and reflects incident light having the first wavelength. The second transmission window W2 is formed on the second substrate 81 in a region different from the dichroic filters 82a to 82c, and transmits incident light. The diffusion film 73c is formed on one of the first transmission window W1 and the second transmission window W2, and diffuses incident light.

Thus, by including the dichroic filters 72 and 82a to 82c, the source light not absorbed by the phosphors 73a and 73b is caused to enter the phosphors 73a and 73b again, and the conversion efficiency from the source light to the fluorescence can be improved. Therefore, it is possible to operate the light source device 10E and the projection image display apparatus 100E including the phosphor wheel 70 with higher efficiency than ever.

According to the phosphor wheel device according to the second embodiment, the diffusion film 73c may be formed of a mixture of a binder made of a transparent material having a predetermined refractive index and a diffusion material having a refractive index different from the refractive index of the binder. Of the first transmission window W1 and the second transmission window W2, the transmission window W2 in which the diffusion film 73c is not formed may have an antireflection film.

Thus, the spatial intensity distribution of the non-fluorescent component light is uniformized in accordance with the spatial intensity distribution of the fluorescent component light, and the unevenness of the image light can be reduced.

According to the phosphor wheel device according to the second embodiment, the diffusion film 73c may be formed of a mixture of a binder made of a transparent material having a predetermined refractive index, a diffusion material having a refractive index different from the refractive index of the binder, and a phosphor excited by incident light having the first wavelength to generate fluorescence having a third wavelength different from the first wavelength. Of the first transmission window W1 and the second transmission window W2, the transmission window W2 in which the diffusion film 73c is not formed may have a filter that transmits incident light having the first and third wavelengths.

Thus, the chromaticity of the blue light emitted as illumination light from the light source device 10E including the phosphor wheel device can be changed.

The light source device 10E according to the second embodiment includes the above-described phosphor wheel device, the drive device 74 that rotates the first substrate 71, the drive device 84 that rotates the second substrate 81, and the light source element 21 that generates source light of the first wavelength. The first substrate 71 and the second substrate 81 are disposed such that the fluorescence excited by the source light incident on the phosphors 73a and 73b from the light source element 21 or the source light incident on the diffusion film 73c from the light source element 21 and diffused by the diffusion film 73c enters the dichroic filters 82a to 82c or the second transmission window W2.

Thus, it is possible to operate the light source device 10E including the phosphor wheel device with higher efficiency than ever.

The projection image display apparatus 100E according to the second embodiment includes the light source device 10E described above.

Thus, it is possible to operate the projection image display apparatus 100E including the phosphor wheel device with higher efficiency than ever.

The phosphor wheel device according to an aspect of the present disclosure is applicable to a light source device and a projection image display apparatus.

The description has been made with reference to the light source device of the projection image display apparatus as an example of the present disclosure, but the light source device according to an aspect of the present disclosure is not limited to this, and it may be an illumination device such as a headlamp.

What is claimed is:

1. A phosphor wheel device comprising:
a substrate made of a transparent material and rotatable about an axis of rotation, the substrate having a first region including a circumference having a first radius from the axis of rotation, and a second region including a circumference having a second radius different from the first radius from the axis of rotation;

a first dichroic filter that is supported by the substrate, the first dichroic filter overlapping with the first region of the substrate in a first direction along the axis of rotation, and the first dichroic filter transmitting incident light having a first wavelength, and reflecting incident light having a second wavelength different from the first wavelength;

a phosphor that is supported by the substrate, the phosphor overlapping with the first region of the substrate and the first dichroic filter in the first direction, and the phosphor being excited by incident light having the first wavelength to generate fluorescence having the second wavelength;

a first transmission window that is formed on the substrate in a region different from a region of the phosphor in the first region, and transmits incident light;

a second dichroic filter that is supported by the substrate, the second dichroic filter overlapping with the second region of the substrate in the first direction, and the second dichroic filter transmitting incident light having the second wavelength, and reflecting incident light having the first wavelength;

a second transmission window that is formed on the substrate in a region different from a region of the second dichroic filter in the second region, and transmits incident light; and a diffusion film that is formed on one of the first and second transmission windows, and diffuses incident light, wherein the diffusion film is formed of a mixture of a binder made of a transparent material having a predetermined refractive index, a diffusion material having a refractive index different from a refractive index of the binder, and a phosphor excited by incident light having the first wavelength to generate fluorescence having a third wavelength different from the first wavelength, and of the first and second transmission windows, a transmission window in which the diffusion film is not formed has a filter that transmits incident light having the first and third wavelengths.

2. A light source device comprising:
the phosphor wheel device according to claim 1;
a drive device that rotates the phosphor wheel device;
a light source element that generates source light of the first wavelength; and
an optical system that guides fluorescence excited by source light incident on the phosphor from the light source element or source light incident on the diffusion film from the light source element and diffused by the diffusion film so as to enter the second dichroic filter or the second transmission window.

3. A phosphor wheel device comprising:
a first substrate made of a transparent material and rotatable about a first axis of rotation, the first substrate having a first region including a circumference having a first radius from the first axis of rotation;
a first dichroic filter that is supported by the first substrate, the first dichroic filter overlapping with the first region of the first substrate in a first direction along the first axis of rotation, and the first dichroic filter transmitting incident light having a first wavelength, and reflecting incident light having a second wavelength different from the first wavelength;

a phosphor that is supported by the first substrate, the phosphor overlapping with the first region of the first substrate and the first dichroic filter in the first direction, and the phosphor being excited by incident light having the first wavelength to generate fluorescence having the second wavelength;

a first transmission window that is formed on the first substrate in a region different from a region of the phosphor in the first region, and transmits incident light;

a second substrate made of a transparent material and rotatable about a second axis of rotation, the second substrate having a second region including a circumference having a second radius from the second axis of rotation;

a second dichroic filter that is supported by the second substrate, the second dichroic filter overlapping with the second region of the second substrate in a second direction along the second axis of rotation, and the second dichroic filter transmitting incident light having the second wavelength, and reflecting incident light having the first wavelength;

a second transmission window that is formed on the second substrate in a region different from the second dichroic filter in the second region, and transmits incident light; and a diffusion film that is formed on one of the first and second transmission windows, and diffuses incident light, wherein the diffusion film is formed of a mixture of a binder made of a transparent material having a predetermined refractive index, a diffusion material having a refractive index different from a refractive index of the binder, and a phosphor excited by incident light having the first wavelength to generate fluorescence having a third wavelength different from the first wavelength, and of the first and second transmission windows, a transmission window in which the diffusion film is not formed has a filter that transmits incident light having the first and third wavelengths.

4. A light source device comprising:
the phosphor wheel device according to claim 3;
a drive device that rotates the phosphor wheel device;
a light source element that generates source light of the first wavelength; and
an optical system that guides fluorescence excited by source light incident on the phosphor from the light source element or source light incident on the diffusion film from the light source element and diffused by the diffusion film so as to enter the second dichroic filter or the second transmission window.

5. A light source device comprising:
the phosphor wheel device according to claim 3;
a first drive device that rotates the first substrate of the phosphor wheel device;
a second drive device that rotates the second substrate of the phosphor wheel device; and
a light source element that generates source light of the first wavelength, wherein
the first and second substrates are disposed such that fluorescence excited by source light incident on the phosphor from the light source element or source light incident on the diffusion film from the light source element and diffused by the diffusion film enters the second dichroic filter or the second transmission window.

6. A projection image display apparatus comprising:
the light source device according to claim 4.

7. A projection image display apparatus comprising:
the light source device according to claim 5.

\* \* \* \* \*